United States Patent
Moon et al.

(10) Patent No.: US 8,363,428 B2
(45) Date of Patent: Jan. 29, 2013

(54) ADAPTER POWER SUPPLY HAVING VARIABLE SWITCHING MODE

(75) Inventors: Gun Woo Moon, Daejeon-si (KR); Byeong Woo Ryu, Suwon-si (KR); Seong Wook Choi, Daejeon-si (KR); Bong Chul Kim, Incheon-si (KR); Dong Seong Oh, Incheon-si (KR)

(73) Assignee: Samsung Electro-Mechanics Co. Ltd., Gyunggi-Do (KR)

( * ) Notice: Subject to any disclaimer, the term of this patent is extended or adjusted under 35 U.S.C. 154(b) by 675 days.

(21) Appl. No.: 12/570,858

(22) Filed: Sep. 30, 2009

(65) Prior Publication Data

US 2010/0302812 A1    Dec. 2, 2010

(30) Foreign Application Priority Data

Jun. 1, 2009    (KR) .................. 10-2009-0048163

(51) Int. Cl.
*H02M 3/335* (2006.01)
(52) U.S. Cl. ................. 363/21.03; 363/21.1; 363/21.18; 363/97
(58) Field of Classification Search ............... 363/21.02, 363/21.03, 21.08, 21.1, 21.11, 21.16, 97, 363/21.18
See application file for complete search history.

(56) References Cited

U.S. PATENT DOCUMENTS

| | | | | |
|---|---|---|---|---|
| 5,262,930 A | * | 11/1993 | Hua et al. | 363/21.03 |
| 5,486,994 A | * | 1/1996 | Pouliquen et al. | 363/98 |
| 5,572,418 A | * | 11/1996 | Kimura et al. | 363/97 |
| 8,027,174 B2 | * | 9/2011 | Ryu et al. | 363/16 |
| 8,098,502 B2 | * | 1/2012 | Mao et al. | 363/21.03 |
| 2007/0285953 A1 | * | 12/2007 | Koo et al. | 363/21.02 |
| 2010/0219802 A1 | * | 9/2010 | Lin et al. | 323/284 |
| 2010/0302812 A1 | * | 12/2010 | Moon et al. | 363/21.01 |
| 2011/0305048 A1 | * | 12/2011 | Yang et al. | 363/21.03 |
| 2012/0014142 A1 | * | 1/2012 | Tsai et al. | 363/21.17 |

FOREIGN PATENT DOCUMENTS

| | | |
|---|---|---|
| JP | 2004304886 | 10/2004 |
| JP | 2002218749 | 8/2008 |
| KR | 10-2005-0038643 A | 4/2005 |
| KR | 1020080012595 | 2/2008 |
| KR | 1020080069626 | 7/2008 |

OTHER PUBLICATIONS

Korean Office Action for Application No. 10-2009-0048163 mailed Nov. 25, 2010.
Korean Notice of Allowance for Application No. 10-2009-0048163 mailed Feb. 22, 2011.

\* cited by examiner

*Primary Examiner* — Jeffrey Sterrett
(74) *Attorney, Agent, or Firm* — Lowe Hauptman Ham & Berner, LLP

(57) ABSTRACT

The present invention relates to an adapter power supply, which includes a switching unit for switching a DC voltage; a transformer which has a primary winding connected to the switching unit, a secondary winding electromagnetically coupled to the primary winding, and an auxiliary winding electromagnetically coupled to the primary winding; a rectifier for rectifying a voltage outputted from the transformer; and a controller for controlling the switching unit to operate according to the PWM scheme in a normal operation mode, and to operate according to a quasi-resonant scheme in a standby mode, by detecting information of a load connected to the rectifier.

5 Claims, 3 Drawing Sheets

[FIG. 1]
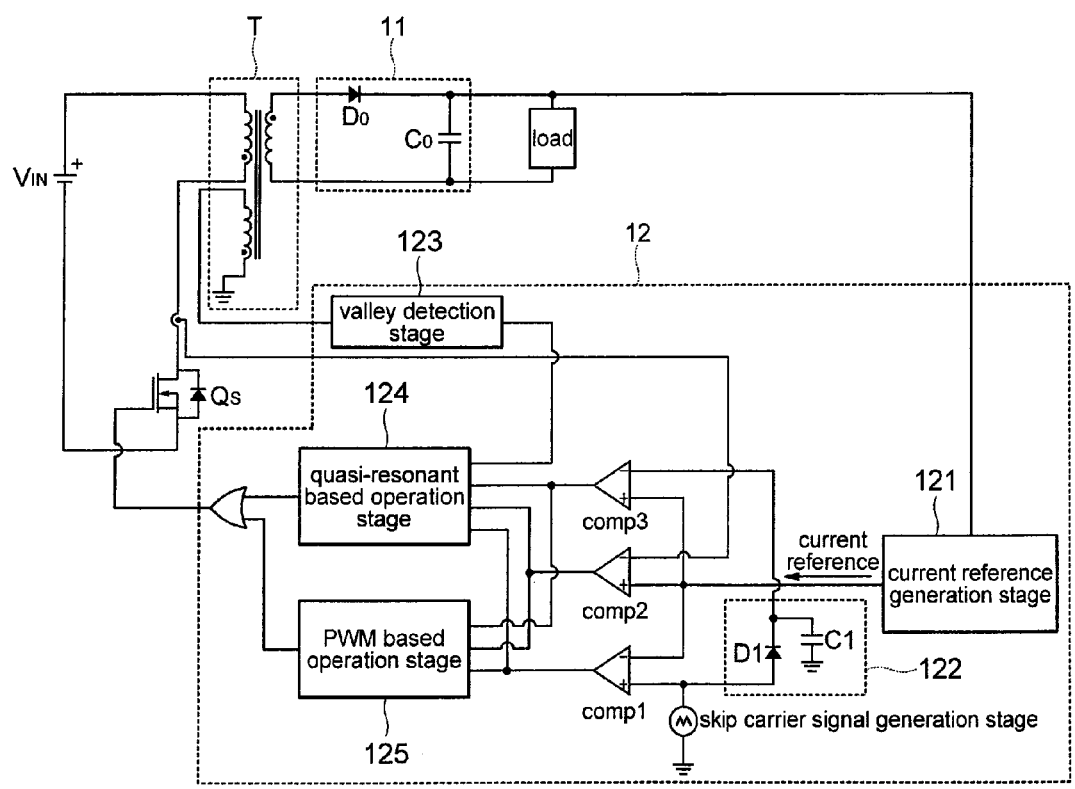

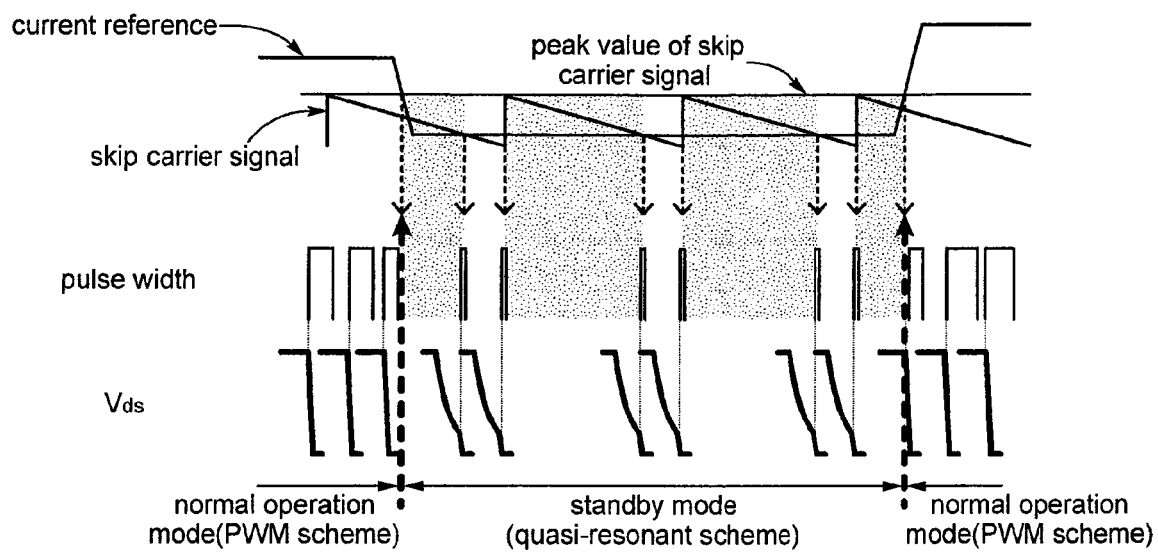
[FIG. 2]

[FIG. 3]
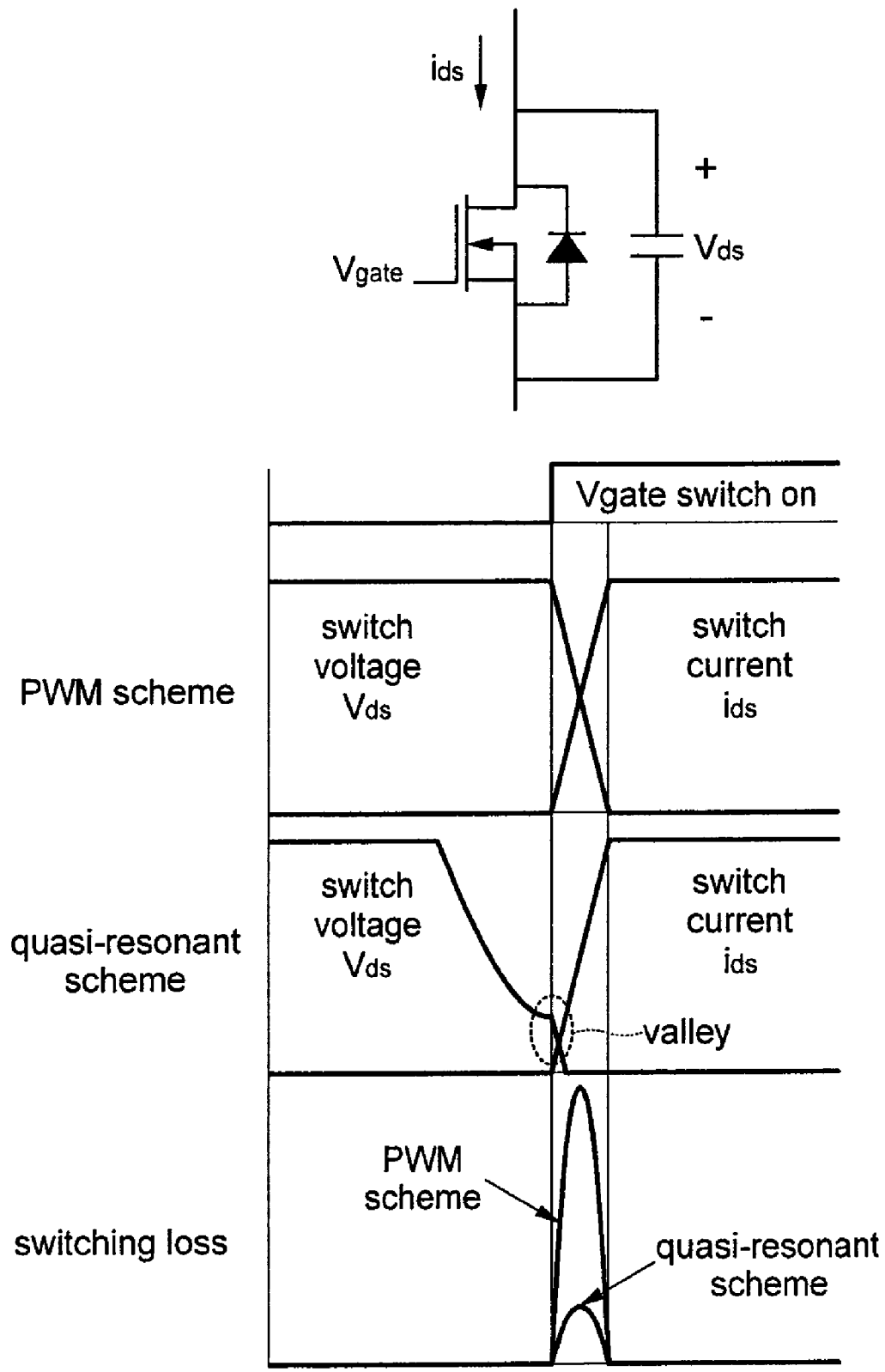

ADAPTER POWER SUPPLY HAVING VARIABLE SWITCHING MODE

CROSS-REFERENCE TO RELATED APPLICATIONS

This application claims the benefit of Korean Patent Application No. 10-2009-0048163 filed with the Korea Intellectual Property Office on Jun. 1, 2009, the disclosure of which is incorporated herein by reference.

BACKGROUND OF THE INVENTION

1. Field of the Invention

The present invention relates to an adapter power supply; and, more particularly, to an adapter power supply which can change an operation scheme of a switching unit into a PWM scheme or a quasi-resonant scheme depending on a normal operation mode and a standby mode.

2. Description of the Related Art

Since an adapter power supply of less than 60 W has a small capacity, a flyback converter or a forward converter has been used as a power stage. A voltage mode control technique or a current mode control technique has bee employed for controlling the converters.

Consumption power based on load conditions of the adapter power supply has been regulated in the market.

In particular, when there is no load, an adapter power supply has been regulated to have consumed power of less than 0.3 W.

To satisfy these conditions, a control Integrated Circuit (IC) must detect a no-load state, and controls consumption power to be minimized while maintaining an output voltage in the detected no-load state.

However, in the prior art, a switching unit operates at a fixed frequency according to a burst scheme, regardless of a mode. In the burst scheme, when an output voltage exceeds a predetermined range, it is judged that there is no load, and accordingly, the switching unit is turned off. Thereafter, when the output voltage is reduced to the predetermined range or lower, the switching unit is turned on again.

Therefore, when a standby mode is implemented in the prior art, the switching unit operates at the fixed frequency even in the standby mode according to the manner similar to that in the normal operation mode, so a large amount of switching loss is produced during the standby mode, and thus it is difficult to minimize standby power.

SUMMARY OF THE INVENTION

The present invention has been invented in order to overcome the above-described problems and it is, therefore, an object of the present invention to provide an adapter power supply which allows the switching unit to operate according to a PWM scheme in the normal operation mode, and to operate according to a quasi-resonant scheme in the standby mode by detecting load information connected to a rectifier.

In accordance with one aspect of the present invention to achieve the object, there is provided an adapter power supply including: a switching unit for switching a DC voltage; a transformer which has a primary winding connected to the switching unit, a secondary winding electromagnetically coupled to the primary winding, and an auxiliary winding electromagnetically coupled to the primary winding; a rectifier for rectifying a voltage outputted from the transformer; and a controller for controlling the switching unit to operate according to the PWM scheme in a normal operation mode, and to operate according to a quasi-resonant scheme in a standby mode, by detecting information of a load connected to the rectifier.

Herein, the wherein the controller includes: a current reference generation stage for generating a current reference by comparing an output voltage of the load with a predetermined reference voltage, so as to detect information of the load; a skip carrier signal generation stage for generating a skip carrier signal; a peak detection stage for detecting a peak value of the skip carrier signal; a first comparison stage for comparing the current reference with the skip carrier signal, thereby determining whether the switching unit is in the normal operation mode, or in the standby mode; a second comparison stage for sensing a current flowing to the switching unit, thereby determining a duty of the switching unit through comparison of the current reference with the sensed current; a third comparison stage for comparing the current reference with the peak value of the skip carrier signal, thereby determining which one of the PWM scheme and the quasi-resonant scheme is to be used for operation of the switching unit; a valley detection stage for detecting a valley of a voltage between both ends of the switching unit through the auxiliary winding; a PWM based operation stage connected to the first comparison stage, the second comparison stage, and the third comparison stage, so as to apply a control signal to the switching unit, wherein the control signal allows the switching unit to operate according to the PWM scheme in the normal operation mode; and a quasi-resonant based operation stage connected to the first comparison stage, the second comparison stage, the third comparison stage, and the valley detection stage, so as to apply a control signal to the switching unit, wherein the control signal allows the switching unit to operate according to the quasi-resonant scheme in the standby mode.

Herein, the peak detection stage includes a diode and a capacitor which are interconnected in parallel to each other.

Herein, the third comparison stage outputs 'high' when the current reference is higher than the peak value of the skip carrier signal, and thus the switching unit is allowed to operate according to the PWM scheme through the PWM based operation stage, and the third comparison stage outputs 'low,' when the current reference is lower than the peak value of the skip carrier signal, and thus the switching unit is allowed to operate according to the quasi-resonant scheme through the quasi-resonant based operation stage.

Herein, the rectifier includes a rectification diode, and a smoothing capacitor.

Herein, the switching unit corresponds to a transistor.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which:

FIG. 1 is a circuit diagram of an adapter power supply in accordance with an embodiment of the present invention;

FIG. 2 is a graph illustrating a waveform of an operation by an adapter power supply in accordance with an embodiment of the present invention; and FIG. 3 is a graph illustrating waveforms of operations according to a PWM and a quasi-resonant scheme.

DETAILED DESCRIPTION OF THE PREFERABLE EMBODIMENTS

The present invention may include several embodiments through various modifications, wherein specific embodiments are exemplified in the accompanying drawings and will be explained in detail. However, it should be understood that the present invention is not limited to the specific embodiments and includes all modifications, equivalents and substitutions falling within the spirit and technical scope of the present invention. In description of the present invention, if it is determined that the gist of the present invention becomes vague due to detailed description of related published techniques, the detailed description thereof will be omitted.

Although terms such as "first" and "second" may be used in order to describe a diversity of components, the components should not be limited by the terms. The terms are used only to distinguish one component from the other components.

The terms of this application are used only to describe the specific embodiment, but they are not aimed at limiting the present invention. A singular form includes a plural form as long as the singular form does not clearly indicate a different thing from the plural form. It should be understood that in this application, terms such as "include" or "have" specify existence of a characteristic, a figure, a step, an operation, a component, a part or a combination thereof which are described in the specification but do not previously exclude existence or possibility of addition of one or more different characteristics, figures, steps, operations, components, parts or combinations thereof.

Hereinafter, the adapter power supply in accordance with the present invention will be described in detail with reference to the accompanying drawings. In describing them with reference to the accompanying drawings, the same or corresponding component will be represented by the same reference numeral and repeated description thereof will be omitted.

FIG. 1 is a circuit diagram of an adapter power supply according to an embodiment of the present invention.

Hereinafter, the adapter power supply in accordance with an embodiment of the present invention will be described with reference to FIG. 1.

The adapter power supply may include a switching unit Qs, a transformer T, a rectifier 11, and a controller 12.

The switching unit Qs can transfer power to a secondary side of the transformer T by switching a DC voltage. In this case, the DC voltage may be a voltage obtained after a commercial input AC power passes an EMI filter and a rectification diode.

Also, the switching unit Qs may be a transistor.

The transformer T may include a primary winding connected to the switching unit Qs, a secondary winding electromagnetically coupled to the primary winding, and an auxiliary winding electromagnetically coupled to the primary winding.

In this case, the auxiliary winding is positioned at the primary side of the transformer T as a constitution for detecting a valley value of a voltage between both ends of the switching unit Qs so as to perform a quasi-resonant scheme. Also, such an auxiliary winding may be positioned at the secondary side of the transformer T.

The rectifier 11 can rectify an AC voltage outputted from the transformer T into a DC voltage to be supplied to a load.

The rectifier 11 may include a rectification diode Do and a smoothing capacitor Co. In particular, an anode of the rectification diode Do may be connected to one end of the secondary winding of the transformer T. One end of the smoothing capacitor Co may be connected to a cathode of the rectification diode Do. Also, the smoothing capacitor Co may be connected in parallel to the load.

The controller 12 can control the switching unit Qs to operate according to a PWM scheme in a normal operation mode, and to operate according to a quasi-resonant scheme in the standby mode, by detecting information of the load connected to the rectifier 11.

In particular, the controller 12 may include a current reference generation stage 121, a skip carrier signal generation stage, a peak detection stage 122, a first comparison stage COMP1, a second comparison stage COMP2, a third comparison stage COMP3, a valley detection stage 123, a quasi-resonant based operation stage 124, and a PWM based operation stage 125.

The current reference generation stage 121 can generate a current reference by comparing an output voltage of the load with a predetermined reference voltage, so as to detect load information. The current reference includes load information capable of identifying whether the load is a light load or a heavy load.

The skip carrier signal generation stage can generate a skip carrier signal which is to be compared with the current reference generated by the current reference generation stage 121.

The peak detection stage 122 can detect a peak value of the skip carrier signal generated in the skip carrier signal generation stage.

The peak detection stage 122 may include a diode D1 and a capacitor C1 which are interconnected in parallel to each other. In particular, the anode of the diode D1 may be connected to the skip carrier signal generation stage. Also, one end of the capacitor C1 may be connected to a ground, and the other end of the capacitor C1 may be connected to a cathode of the diode D1.

A first comparison stage COM1 compares the current reference generated by the current reference generation stage 121 with the skip carrier signal generated by the skip carrier signal generation stage, thereby determining whether the switching unit Qs is in a normal operation mode, or in a standby mode.

The second comparison stage COMP2 senses a current flowing to the switching unit Qs, and then compares the sensed current with the current reference generated by the current reference generation stage 121, thereby determining a duty of the switching unit Qs.

The third comparison stage COMP3 compares a peak value of the skip carrier signal detected by the peak detection stage 122 with the current reference generated by the current reference generation stage 121, thereby determining whether the switching unit Qs is to operate according to a PWM scheme or according to a quasi-resonant scheme.

That is, when the load is large, the current reference is higher than the peak value of the skip carrier signal. Thus, an output of the third comparison stage COMP3 is 'high', and the switching unit Qs can be allowed to operate according to the PWM scheme through a PWM based operation stage 125 to be described. Alternatively, when the load is small, the current reference is lower than the peak value of the skip carrier signal. Thus, an output of the third comparison stage COMP3 is 'low', and the switching unit Qs can be allowed to operate according to the quasi-resonant scheme through the quasi-resonant based operation stage 124.

The valley detection stage 123 can detect a valley of a voltage between both ends of the switching unit Qs through the auxiliary winding of the transformer T. The valley detection stage 123 is a component necessary when the switching unit operates according to the quasi-resonant scheme.

The quasi-resonant based operation stage 124 is connected to the first comparison stage COMP1, the second comparison stage COMP2, the third comparison stage COMP3, and the valley detection stage 123. When it is judged by the first comparison stage COMP1 that the switching unit Qs is in the standby mode, and it is judged by the third comparison stage COMP3 that the switching unit Qs operates according to the quasi-resonant scheme, the duty of the switching unit Qs is determined by the second comparison stage COMP2 such that the quasi-resonant based operation stage 124 can apply a control signal to the switching unit Qs. Herein, the control signal allows the switching unit Qs to operate in the standby mode according to a quasi-resonant scheme in which switching is performed at a valley detected by the valley detection stage 123.

The PWM based operation stage 125 is connected to the first comparison stage COMP1, the second comparison stage COMP2, the third comparison stage COMP3. When it is judged by the first comparison stage COMP1 that the switching unit Qs is in the normal operation mode, and it is judged by the third comparison stage COMP3 that the switching unit Qs operates according to the PWM scheme, the duty of the switching unit Qs is determined by the second comparison stage COMP2 such that the PWM based operation stage 125 can apply a control signal to the switching unit Qs. Herein, the control signal allows the switching unit Qs to operate according to the PWM scheme in the normal operation mode.

FIG. 2 is a waveform illustrating an operation of the adapter power supply in accordance with an embodiment of the present invention.

Referring to FIG. 2, when the load is decreased, the output voltage is increased, and thus the current reference is decreased for control of the increased output voltage. When the current reference is lower than the peak value of the skip carrier signal while being decreased, the PWM based operation is stopped and the quasi-resonant based operation is started. Alternatively, when the load is increased, the output voltage is decreased, and thus the current reference is increased. In this case, when the current reference is higher than the peak value of the skip carrier signal, the quasi-resonant based operation is stopped, and then is changed into the PWM based operation.

FIG. 3 is waveforms illustrating the PWM based operation and the quasi-resonant based operation.

Referring to FIG. 3, a switching turn-on loss of the switching unit Qs may be expressed by the product of a voltage, which is applied to each end of the switching unit Qs when the switch is turned on, and a current flowing to the switching unit Qs. In this case, when the voltage applied to each end of the switching unit Qs is decreased, it is possible to reduce the switching turn-on loss.

The transformer T supplies power to a secondary side while the switching unit Qs is turned off. In this case, it can be found that the voltage of each end of the switching unit Qs in the quasi-resonant based operation is even lower than that in the PWM based operation, as shown in FIG. 3. Therefore, it can be found that the switching turn-on loss in the quasi-resonant based operation is even lower than that in the PWM based operation.

In the quasi-resonant scheme, the switching turn-on loss is lower in comparison with the PWM scheme. However, since a frequency is changed depending on load conditions, power used in a heavy load or more is high, and thus an EMI (Electromagnetic Interference) occurs, which results in an effect on other devices.

Therefore, in the adapter power supply in accordance with the embodiment of the present invention, in order to avoid the EMI, in the case of a light load or more, it is judged that the switching unit Qs is in the normal operation mode, and the switching unit Qs is allowed to operate according to the PWM scheme. However, when the load becomes low, used power is decreased even if a frequency is changed, and thus an EMI is reduced. Therefore, it is judged that the switching unit Qs is in the standby mode, and an operation scheme of the switching unit Qs is changed into a quasi-resonant scheme, thereby reducing the switching turn-on loss.

That is, since the EMI occurs in the light load or more, it is judged that the switching unit Qs is in the normal operation mode. Then, the switching unit Qs is allowed to operate according to the PWM scheme employing a fixed frequency. Thereafter, when the load becomes low, it is judged that the switching unit Qs is in the standby mode by using a decrease in the EMI, so that the switching unit Qs is allowed to operate according to the quasi-resonant scheme in which the switching turn-on loss is low.

In accordance with the embodiment of the present invention, information of a load connected to the rectifier is detected so that the switching unit Qs is allowed to operate according to the PWM scheme in the normal operation mode, and to operate according to the quasi-resonant scheme in the standby mode, resulting in reduction of the power used at the time of the standby mode.

As described above, although the preferable embodiments of the present invention have been shown and described, it will be appreciated by those skilled in the art that substitutions, modifications and changes may be made in this embodiment without departing from the principles and spirit of the general inventive concept, the scope of which is defined in the appended claims and their equivalents.

Embodiments beside the above-described embodiment may exist within the appended claims of the present invention.

What is claimed is:

1. An adapter power supply having variable switching mode, the adapter power supply comprising:
   a switching unit for switching a direct-current (DC) voltage;
   a transformer including
      a primary winding connected to the switching unit,
      a secondary winding electromagnetically coupled to the primary winding, and
      an auxiliary winding electromagnetically coupled to the primary winding;
   a rectifier for rectifying a voltage outputted from the transformer; and
   a controller for controlling the switching unit
      to operate according to a pulse width modulation (PWM) scheme in a normal operation mode, and
      to operate according to a quasi-resonant scheme in a standby mode, by detecting information of a load connected to the rectifier, wherein
   the controller comprises:
      a current reference generation stage for generating a current reference by comparing an output voltage of the load with a predetermined reference voltage, so as to detect the information of the load;
      a skip carrier signal generation stage for generating a skip carrier signal;
      a peak detection stage for detecting a peak value of the skip carrier signal;
      a first comparison stage for comparing the current reference with the skip carrier signal, thereby determining whether the switching unit is in the normal operation mode or in the standby mode;
      a second comparison stage for sensing a current flowing through the switching unit, thereby determining a duty of the switching unit through comparison of the current reference with the sensed current;

a third comparison stage for comparing the current reference with the peak value of the skip carrier signal, thereby determining which one of the PWM scheme and the quasi-resonant scheme is to be used for operation of the switching unit;

a valley detection stage for detecting a valley of a voltage between both ends of the switching unit through the auxiliary winding;

a PWM based operation stage connected to the first comparison stage, the second comparison stage, and the third comparison stage, so as to apply a control signal to the switching unit, wherein the control signal allows the switching unit to operate according to the PWM scheme in the normal operation mode; and a quasi-resonant based operation stage connected to the first comparison stage, the second comparison stage, the third comparison stage, and the valley detection stage, so as to apply a control signal to the switching unit, wherein the control signal allows the switching unit to operate according to the quasi-resonant scheme in the standby mode.

2. The adapter power supply of claim 1, wherein the switching unit corresponds to a transistor.

3. The adapter power supply of claim 1, wherein the peak detection stage includes a diode and a capacitor which are interconnected in parallel to each other.

4. The adapter power supply of claim 1, wherein
the third comparison stage is configured to output 'high' when the current reference is higher than the peak value of the skip carrier signal, and thus the switching unit is allowed to operate according to the PWM scheme through the PWM based operation stage, and
the third comparison stage is configured to output 'low,' when the current reference is lower than the peak value of the skip carrier signal, and thus the switching unit is allowed to operate according to the quasi-resonant scheme through the quasi-resonant based operation stage.

5. The adapter power supply of claim 1, wherein the rectifier includes a rectification diode and a smoothing capacitor.

* * * * *